United States Patent [19]
Nakamaru et al.

[11] Patent Number: 6,010,801
[45] Date of Patent: Jan. 4, 2000

[54] CYLINDRICAL STORAGE BATTERY

[75] Inventors: Hisao Nakamaru, Kamakura; Norio Suzuki; Toshihide Eguchi, both of Chigasaki; Masato Onishi, Fujisawa, all of Japan

[73] Assignee: Matsushita Electric Industrial Co., Ltd., Osaka, Japan

[21] Appl. No.: 09/028,067

[22] Filed: Feb. 23, 1998

[30] Foreign Application Priority Data

May 12, 1997 [JP] Japan .................................. 9-120634
Dec. 3, 1997 [JP] Japan .................................. 9-332607

[51] Int. Cl.[7] .......................... H01M 2/26; H01M 4/00; H01M 10/16; H01M 2/18
[52] U.S. Cl. ......................... 429/161; 429/94; 429/208; 429/246
[58] Field of Search .............................. 429/94, 161, 208, 429/246

[56] References Cited

U.S. PATENT DOCUMENTS

| | | |
|---|---|---|
| 3,732,124 | 5/1973 | Cailley . |
| 4,009,053 | 2/1977 | Schenk et al. . |
| 4,053,687 | 10/1977 | Coibion et al. ............................ 429/94 |
| 4,332,867 | 6/1982 | Tsuda et al. ............................ 429/94 |
| 4,767,682 | 8/1988 | Dorogi et al. ............................ 429/94 |
| 4,963,446 | 10/1990 | Roels et al. ............................ 429/94 |
| 5,043,235 | 8/1991 | Seefeldt et al. ............................ 429/94 |
| 5,238,757 | 8/1993 | Suzuki et al. . |

FOREIGN PATENT DOCUMENTS

| | | |
|---|---|---|
| 2260878 | 9/1975 | France . |
| 3019186 | 11/1981 | Germany . |
| 55-113261 | 9/1980 | Japan . |
| 60-105166 | 6/1985 | Japan . |

*Primary Examiner*—Maria Nuzzolillo
*Assistant Examiner*—Tracy Dove
*Attorney, Agent, or Firm*—Stevens, Davis, Miller & Mosher, L.L.P.

[57] ABSTRACT

A cylindrical storage battery has a spirally coiled electrode plate assembly in which the shape of the current collector welded to the end part of the electrode plate assembly and the crossing parts of the rib-formed projections of the current collector and the electrode plate terminal edges are welded with sufficient strength to permit a high-rate charge and discharge. A storage battery having a spirally coiled electrode plate assembly includes a positive electrode plate, a negative electrode plate, a separator, and rectangular current collectors, respective ones of which are welded respectively to terminal edges of the electrodes respectively projecting outward from the upper and the lower end planes of the electrode assembly. The current collector welded to the end part of the electrode plate assembly has a flat plate part provided with rectangular cutout parts, in a radial manner and with equal intervals therebetween at four places, and which extend from the neighborhood of the center to the outer peripheral edge of the plate part, and rib-formed projections which are formed integrally, bent downward, at the two opposed edge parts of the respective cutout parts and are made to cross the terminal edge of the electrode plate and are welded thereto.

8 Claims, 3 Drawing Sheets

CYLINDRICAL STORAGE BATTERY

BACKGROUND OF THE INVENTION

The present invention relates to a cylindrical storage battery provided with a spirally coiled electrode plate assembly. More particular, it relates to an alkaline storage battery which is suitable for, for example, the driving power source of vehicles. The battery is improved in the shape of the current collector welded to the upper and lower parts of the electrode plate assembly to provide high-rate charge and discharge.

RELATED ART

Various types of cylindrical alkaline storage batteries are known, representatives of which include nickel-cadmium storage batteries and nickel-metal hydride storage batteries. These batteries are in wide use for various equipment, such as portable telephones and notebook-sized personal computers, because of their high reliability and easy maintenance. In recent years, the development of cylindrical storage batteries suited to high-rate discharge are eagerly awaited as the power source for motor power-assist bicycles, lawn mowers and further electric automobiles and the like.

Such a cylindrical storage battery for high-rate discharge has an electrode plate assembly comprising one strip-shaped positive electrode plate and one strip-shaped negative electrode plate which are wound as spiral coils with a separator interposed therebetween, and the assembly is housed in a battery case made of metal. As to the structure of a current collector which is suitable for collecting a large amount of electric current, a type in which respectively one rectangular or nearly circular plate-formed current collector is welded at a plurality of spots to the terminal edge projecting outward from the end plane of the electrode plate assembly (this type being hereinafter referred to as tabless type) is disclosed for example, in U.S. Pat. Nos. 3,732,124 and 5,238,757, and is in generally use at present.

Various types have been proposed for such current collectors welded to the terminal part of the electrode plate assembly, a representative one of which is the current collector 14 shown in FIG. 8. This current collector is provided with a rectangular flat plate part 14a, rib-formed projections 14b formed by bending vertically downward the both side edges stretching along the length direction of the plate part 14a, and two U-shaped cutout parts 14c or punched holes. The welding of the current collector 14 to the electrode plate assembly is effected by making the rib-formed projection 14b to cross the terminal edge of one side electrode projecting upward from the electrode plate assembly, pressing a pair of bar-formed welding electrodes against the upper side of the flat plate parts 14d which hold the cutout part 14c therebetween or against the upper side of the projection 14b, and passing electricity between the electrodes under application of pressure.

In the above-mentioned current collector 14, however, the rib-formed projection 14b is formed at both side edges which extend along the length direction of the plate part 14a. Accordingly, even when welding is conducted by pressing a pair of welding electrodes against the plate part 14a located at the positions which hold the cutout part 14c therebetween and passing electricity under applied pressure, the electric current which flows through the plate part 14a between the pair of welding electrodes (namely, loss current in welding) is large, owing to the distance of electricity passage and the electric resistance. On the contrary, the electric current which flows through the crossing part of the pair of projections 14b and the electrode terminal edge is small, so that it is difficult to melt the crossing part of the projection 14b and the electrode terminal edge sufficiently to secure good welding. Resultantly, the weld part, namely the integrated part formed by the rib-formed projection 14b and the electrode terminal edge, has a high contact resistance and, when the battery is discharged with a large electric current, for example 3c (electric current of three times the battery capacity), the IR drop at the weld part is too large to give a satisfactory battery performance.

SUMMARY OF THE INVENTION

The main object of the present invention is to provide a storage battery which overcomes the above-mentioned difficulties and which permits charge and discharge at high rates by improving the shape of the current collector welded to the end part of the spirally coiled electrode plate assembly to concentrate the welding current at the crossing part of the rib-formed projection provided to the current collector and the projecting terminal edge of the electrode and thereby to melt the crossing part sufficiently to effect firm welding.

According to the present invention, there is provided a cylindrical storage battery comprising a spirally coiled electrode plate assembly consisting essentially of a positive electrode plate, a negative electrode plate and a separator each in the form of a strip, and respectively one current collector formed essentially of a rectangular or nearly circular plate, which collector is welded respectively to the terminal edge of either the positive electrode or the negative electrode respectively projecting outward from the upper and the lower end planes of the electrode plate assembly, the respective current collectors being provided with a plurality of cutout parts, in a radial manner, which extend from the neighborhood of the center of the plate part to the outer peripheral edge of the plate part and with rib-formed projections integrally formed downward at the edge parts of each of the cutout parts, the rib-formed formed projections being welded to the terminal edge of one side electrode plate at a state of crossing the terminal edge and partly biting thereinto.

DESCRIPTION OF THE PREFERRED EMBODIMENTS

The shape of the current collector is very important for welding it securely to the electrode plate terminal edge projecting outward from the electrode plate assembly.

For example, if a pair of electrodes for electric resistance welding are merely held against the flat part, devoid of a cutout part, of a current collector, the loss current, which flows through the surface of the flat part between the electrodes and does not contribute to welding, increases, making it difficult to weld securely the rib-formed projection of the current collector to the electrode terminal edge at a plurality of spots.

In the present invention, the current collector is made of nickel plated steel and is provided with a plurality of cutout parts which reach the outer peripheral edge of the current collector and open there in a radial manner. Downward rib-formed projections are integrally formed at the edge parts of the respective cutout parts.

Accordingly, the rib-formed projections and the terminal edge of one side electrode plate projecting from the end part of the electrode plate assembly cross each other; therefore, by pressing a pair of welding electrodes against the current collector so as to hold the rectangular cutout part therebetween, the loss current which flows on the current collector surface between the pair of welding electrodes decreases by virtue of the cutout part and the welding current which flows into the crossing part of the projection located on the underside of the cutout part and the terminal edge of the electrode plate is increased, whereby welding is effected securely at a number of crossing parts.

The shape of the cutout parts is not limited, for example, they can be a rectangular cutout part, a U-shaped cutout part and a trapezoidal cutout part. For the convenience of manufacturing the rib-formed projections, a rectangular cutout part is preferable. Cutout parts are preferably formed with equal intervals. The number of cutout parts is preferably 4~8, more preferably 4~6. The rib-formed projections may be formed only at the two opposed edge parts of each of the cutout parts. The height (width) and the thickness of the rib-formed projection which is to cross the terminal edge of the electrode plate also are important for securing the crossing part and concentrating the welding current. In the present invention, the length of a rib-formed projection from the plate part should be smaller than the length (width) of the bare part of the nickel plated steel perforation sheet which constitutes the projecting terminal edge of the electrode plate; preferably the projection length of a projection is ⅕ to ⅔ of the width of the bare part of the perforation sheet so that the projection may not touch the terminal edge of the opposite electrode even at the completion of welding. The thickness of the projection is preferably 2–8 times the thickness of the perforation sheet so that the tip of the projection may be held securely against the end surface of the perforation sheet bare part of the electrode plate and the crossing parts may generate heat uniformly by resistance and may be uniformly molten and deformed.

One aspect of the present invention specifies the shape and the state of welding of current collectors for a positive and a negative electrode which are welded to the terminal edges of the electrode plates respectively projecting outward from the upper and the lower end of a spirally coiled electrode plate assembly. The current collectors for the positive and the negative electrode are securely welded to the electrode plate terminal edges at a number of spots, whereby a current collecting structure which permits high-rate charge and discharge is provided.

Other aspects of the present invention specify the specific shape and size of the rib-formed projections and the relation of the size of the projections to the size of the perforation sheet part of the electrode plate terminal edge to be welded thereto, to secure weld parts suited to high-rate discharge.

Other details of the present invention and preferred structures of batteries which permit high-rate charge and discharge are described below with reference to the accompanying drawings and Examples.

DESCRIPTION OF EXAMPLES

Some specific examples of the present invention are described below.

Figure 1:
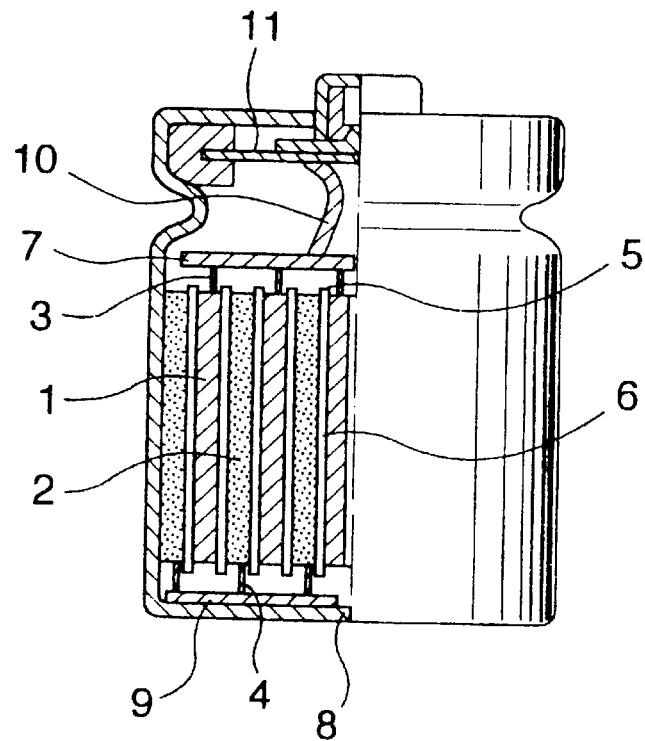
FIG. 1 is a partially sectional side view of a nickel-cadmium storage battery shown in a first Example of the present invention.

FIG. 1 is a sectional side view of a nickel-cadmium storage battery provided with a current collector of tabless type shown in the first Example of the present invention. The battery A has a diameter of 33 mm, a height of 61.5 mm and a nominal capacity of 5,000 mA. The structure of the battery A is described in detail below.

A sintered type nickel positive electrode plate 1 1.0 mm in thickness and a paste type cadmium negative electrode plate 2 0.7 mm in thickness were prepared, the respective electrode plates were provided at their lengthwise terminal edges with bare perforation sheet parts 3 and 4, a separator 6 was interposed between the electrode plates such that the bare perforation sheet parts 3 and 4 respectively project by about 15 mm above and below an electrode plate assembly 5, and the whole was wound spirally to form an electrode plate assembly 5 about 30 mm in diameter and about 50 mm in height.

A rectangular current collector 7 having a diagonal length of about 27 mm provided at the central part with a hole was arranged right above the upper end plane of the above-mentioned electrode plate assembly 5, and while keeping a rectangular current collector 8 having the same or a slightly larger diagonal length than the current collector 7 provided at the central part with a connecting tongue-shaped lead used for welding in contact with the bare perforation sheet part 4 of the lower end plane of the electrode plate assembly 5, the current collectors were welded respectively to the bare perforation sheet parts 3 and 4 at a plurality of spots by using a pair of welding electrodes. The details of welding are described later. The electrode plate assembly 5 was inserted into a metal case 9, one welding electrode was passed through the central hole of the current collector 7 so as to press the tongue-shaped lead provided at the center of the current collector 8, and the pressed part was welded to the inner bottom surface of the battery case.

Then a predetermined amount of an alkaline electrolyte was poured into the battery case 9 by using the central hole and the cutout parts of the current collector 7, the end of a connecting lead provided to the current collector 7 was welded to the lower surface of a sealing plate 11 which doubles as the positive electrode terminal, and the opening of the case 9 was hermetically sealed with the sealing plate 11. Thus, the battery A of the present invention was obtained.

Figure 2:
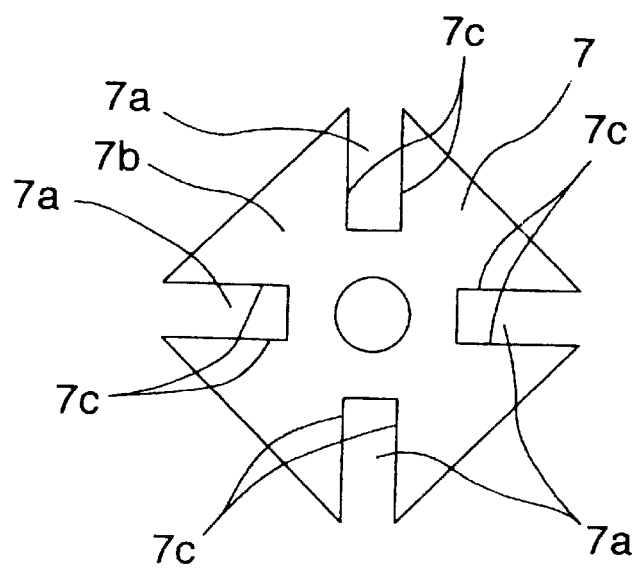
FIG. 2 is a top view of the current collector of the above-mentioned battery.
Figure 3:
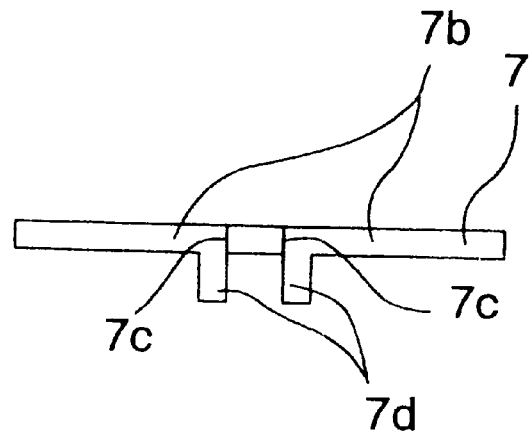
FIG. 3 is a front view of the current collector of the above-mentioned battery.

As shown in FIG. 2, the rectangular current collector 7 welded to the upper part of the electrode plate assembly is formed of a flat plate part 7b 0.4 mm in thickness provided at the center with a hole for passing a welding electrode therethrough in a diameter of, for example, 6 mm and provided with rectangular cutout parts 7a which extend from the neighborhood of the hole to the outer peripheral edge in a width of 3 mm at four places with equal intervals therebetween and in a radial manner, and of rib-formed projections 7d provided integrally by bending downward at the two opposed edge parts of each of the cutout parts 7a and welded as shown in FIG. 3 to the bare perforation sheet part 3 of the positive electrode plate 1 crossing therewith. The welding of the projection 7d to the bare perforation sheet part of the electrode plate terminal edge was performed by holding a pair of welding electrode having a rectangular tip against the flat plate part 7b along the edge part 7c so as to hold the cutout part 7a therebetween, and passing an alternate current of about 2,000 A between the pair of electrodes for about 10 µ sec while pressing the welding electrodes against plate part 7b.

In this way, the welding current which flows on the flat surface of the current collector 7 between the pair of welding electrodes decreases as the result of obstruction by the rectangular cutout part 7a and increase in distance which the current flows. On the other hand, the distance between the welding electrode through the bare perforation sheet decreases relatively, to increase the welding current which flows into the crossing part of the bare perforation sheet part of the electrode plate and the rib-formed projection 7d. In this instance, in order to weld simultaneously a large number of crossing parts of the projections 7d and the bare perforation sheet part of electrode plate, the terminal shape of the pair of the welding electrodes is preferably in the form of a rectangle, which makes it possible to hold the welding electrode tip approximately along the length direction of the cutout part 7a.

This welding technique was applied not only to the positive electrode current collector 7 but also to the welding of the crossing part of the negative electrode current collector 8 and the bare perforation sheet part 4 of the negative electrode plate. The connecting tongue-shaped lead formed at the center of the negative electrode current collector was welded to the inner bottom center of the battery case while being pressed with the welding electrode passed through the hole located at the center of the positive electrode current collector.

Figure 8:
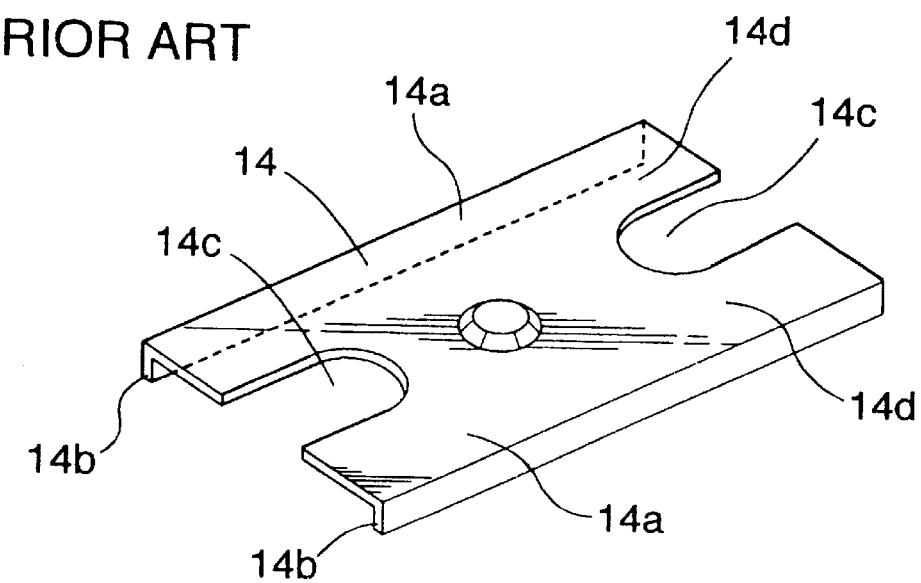
FIG. 8 is a perspective view showing a representative current collector of the prior art.

For comparison with the battery described above, a battery B of Comparative Example was prepared with the same structure as described above except that the current collector 14 mentioned above was used in place of the current collector 7 welded to the upper part of the electrode plate assembly 5. The current collector 14 is composed, as shown in FIG. 8, of a rectangular flat plate part 14a 0.4 mm in thickness, rib-formed projections 14b of the same thickness formed by bending perpendicularly both side edges of the plate part 14a, and of cutout parts 14c.

The two batteries A and B were respectively charged with an electric current of 5A for 1.5 hours and then discharged with an electric current of 15A (that is, 3C) until the terminal voltage reached 1.0 V. The discharge capacity and the average discharge voltage determined from the test are shown in Table 1.

TABLE 1

| Battery | Discharge capacity | Average discharge voltage |
|---------|--------------------|-----------------------------|
| A | 5000 mAh | 1.18 V |
| B | 4700 mAh | 1.16 V |

As shown in Table 1, the discharge capacity of the battery A was 300 mAh higher than that of the battery B, and the average discharge capacity of the battery A was 0.02 V higher than that of the battery B.

With a view to verifying the difference in performance, the batteries A and B were disassembled and examined. In the battery A, the positive electrode side current collector 7 welded to the upper part of the electrode plate assembly was found to be firmly welded because, at all of the crossing parts of the rib-formed projections 7d and the bare perforation sheet parts 3, the projection 7d bit into the perforation sheet part 3 and melted as such; the weld part also showed a sufficient tensile strength. In the battery B, on the other hand, the positive electrode side current collector 14 welded to the upper part of the electrode plate assembly was not sufficiently welded at a plurality of spots among the crossing parts of the projections 14b and the bare perforation sheet parts 3, such insufficiently welded parts are readily peeled apart on stretching, and the weld parts as a whole showed an insufficient tensile strength.

The fact that the battery B has a plurality of parts where the projection 14b and the bare perforation sheet part 3 are not sufficiently melted and welded signifies that the contact resistance of the weld parts of the projection 14b to the bare perforation sheet part 3 as a whole increases; resultantly, the battery B has an increased internal resistance and hence showed a lower average discharge voltage and lower discharge capacity than the battery A.

In the battery A, the rib-formed projection 7d of the current collector 7 is provided integrally, but downward, at the opposed edge parts 7c of the cutout part 7a; accordingly, when a pair of welding electrodes are held against the current collector, the welding electric current which flows through the plate part 7b of the side more external than the projection 7d is small and most of the welding electric current concentrates to the projection 7d, so that at each of the points where the projections 7d cross the bare perforation sheet parts 3 the projection 7d bit into the bare perforation sheet part 3 and melted as it was, resulting in firm welding of the part. Consequently, the battery had a lower resistance than the battery B, permitting sufficient discharge with a large electric current; resultantly, the value of electric current which can be charged and discharged with the battery A and its discharge capacity were both high.

Figure 4:
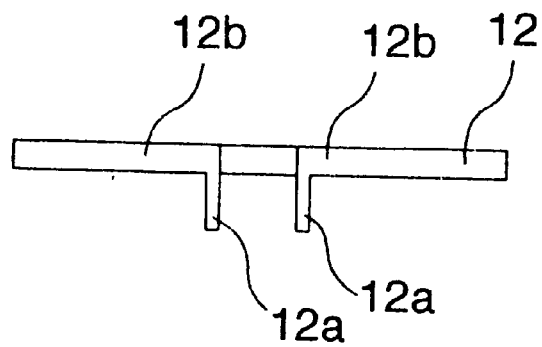
FIG. 4 is a front view of a current collector of another example.

In the above Example, as shown in FIG. 3, a current collector 7 constructed of a rib-formed projection 7d and a plate part 7b both of the same thickness was used. However, another current collector 12 may also be used wherein, as shown in FIG. 4, the rib-formed projections 12a are bent downward at the opposed edge parts of the cutout part while being drawn to reduce their sectional area, so as to provide a thickness of the projections 12a smaller than that of the plate part 12b, for example, the thickness of the plate part of 0.4 mm and the thickness of the projections 12a of 0.3 mm. This structure is advantageous in that in welding the projection 12a to the electrode terminal edge, the welding current is more readily concentrated to the projection 12a and welding is more securely effected.

Figure 5:
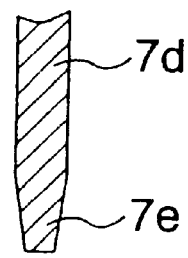
FIG. 5 is a sectional view of the lower end part of the projection of a current collector.

In the above Example, as shown in FIG. 3, the rib-formed projection 7d used was of the same shape over the whole of its height, in this case a rectangular shape. However, another structure wherein, as shown in the sectional view of FIG. 5, the lower end of the projection 7d is shaved to provide a sharp part 7e of the form of knife edge is advantageous in that the tip of the projection more easily bites into the bare perforation sheet part of the electrode terminal edge, the state of welding becomes more secure and resultantly the welding strength increases.

Figure 6:
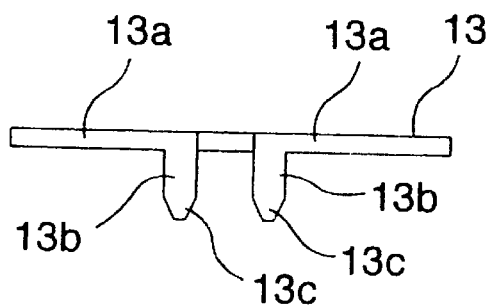
FIG. 6 is a front view of a current collector of still another example.

Further, yet another current collector 13 is shown in FIG. 6. In this embodiment the shape viewed from the top is the same as that shown in FIG. 2 but, as shown in FIG. 6, the plate part 13a is subjected to pressing treatment to obtain a thickness smaller than the initial thickness. For example, the thickness is reduced from 0.5 mm to 0.4 mm, and the thickness of the projection 13b is selected at 0.5 mm so as to be larger than that of the plate part 13a. The the terminal edge 13c of projection 13b is sharpened by shaving into the form of a knife edge. This structure is suited for taking out a large electric current because it can increase particularly the area of the electric current take-out part while giving approximately the same welding effect as in the above Example.

Thus, the thickness of the current collector is preferably 0.25–0.5 mm to secure good welding and sufficient sectional area of passage of electricity. The height of the projection, though it depends also on the length (i.e., width) of the projecting part of the perforation sheet which the projection crosses and bites into, is preferably about 0.5–0.7 mm when the length of the projecting part is about 0.7–1.8 mm. When the above-mentioned respective dimensions are within the aforesaid ranges, a secure welding can be attained while reducing that part of the electrode plate which does not participate in the electromotive reaction.

Figure 7:
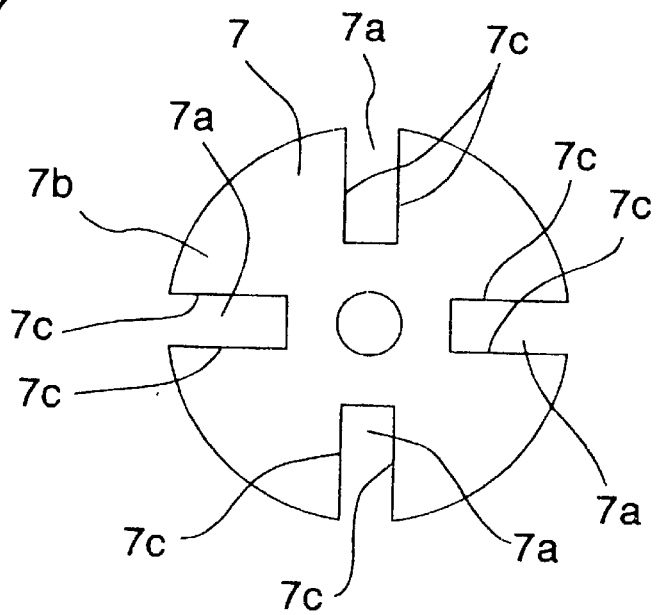
FIG. 7 is a top view of the nearly circular plate-formed current collector of the present invention.

The shape of the above-mentioned current collector viewed from the top is not limited to the rectangular one shown in FIG. 2. A current collector wherein the plate part 7b is nearly circular as shown in FIG. 7 may also be used in accordance with the type of cylindrical storage battery. When such a current collector is welded to the end part of the electrode plate assembly, approximately the same effect can be obtained as in the Example. Further, though a nickel-cadmium storage battery was exemplified in the first Example, the present invention may also be applied to other alkaline storage batteries, such as a nickel-metal hydride storage battery, so long as they are of cylindrical type.

Thus, according to the present invention, in a cylindrical storage battery having a spirally coiled electrode plate assembly, a rectangular or nearly circular plate-formed current collector welded to the upper part of the electrode plate assembly has a flat plate part provided with a plurality of rectangular cutout parts, in a radial manner and with equal intervals therebetween, which extend from the neighborhood of the center to the peripheral edge of the plate. Rib-formed projections are formed integrally downward at the two opposed edge parts of respective cutout parts and are to be crossed and welded with the one side electrode terminal edge. As a result, the terminal edge of the one side electrode and the rib-formed projection of the current collector can be securely melted and firmly welded with each other at a state wherein the two are crossing and biting into each other. Resultantly, a battery which has an excellent current collecting structure and permits high-rate discharge can be provided.

What is claimed is:

1. A cylindrical storage battery comprising an electrode plate assembly consisting essentially of a strip-formed positive electrode comprising a sintered type nickel substrate and an active material held thereon, a negative electrode plate comprising a strip-formed, perforation sheet and a paste-like electrode material coated on the both sides thereof and a strip-formed separator wound in entirety in the form of a spirally coiled electrode plate assembly, the positive electrode plate having the perforation sheet of the substrate terminal part projected upward and the negative electrode plate having the perforation sheet of its terminal part projected downward, a positive electrode current collector formed essentially of a rectangular or circular plate welded to the perforation sheet projecting part of the positive electrode plate projecting upward of the electrode plate assembly, a negative electrode current collector formed essentially of a rectangular or circular plate welded to the perforation sheet projecting part projecting downward, a metal case which houses the above-mentioned members therein and doubles as the output-input terminal of the negative electrode, and a sealing plate provided on the upper side thereof, electrically insulated from the case, with a cap which seals the case and doubles as the input-output terminal of the positive electrode, said positive electrode current collector being provided with a hole at the center thereof and with a plurality of cutout parts, which extend from the peripheral part of the hole to the outer peripheral edge of the current collector, rib-formed projections formed integrally by bending at the edge parts of respective cutout parts being made to cross the perforation sheet projecting part of the positive electrode plate to bite partly into the perforation sheet and welded thereto at a plurality of spots, and a lead piece welded at one end to the plate part being welded at the other end to the underside of the sealing plate, and the negative electrode current collector being provided with a tongue-shaped lead formed by cutting out a part thereof at the central part, said lead being welded to the inner bottom of the battery case, and with a plurality of cutout parts, which extend from the peripheral part of the tongue-shaped lead to the outer peripheral edge of the current collector, rib-formed projections formed integrally by bending at the edge parts of respective cutout parts being made to cross the perforation sheet bare part of the negative electrode plate to bite partly into the perforation sheet and welded at a plurality of spots.

2. The cylindrical storage battery according to claim 1 wherein the length of the perforation sheet projecting parts formed in the positive and the negative electrode plates is about 0.7–1.8 mm, and the length of the rib-formed projections from the plate part provided integrally at the respective cutout parts of the positive electrode current collector and the negative electrode current collector is about 0.4–0.7 mm.

3. The cylindrical storage battery according to claim 1 wherein the positive and the negative current collectors are both formed essentially of a nickel-plated iron flat plate and the lead piece welded at one end to the positive electrode current collector is formed essentially of a nickel plate.

4. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, the respective current collectors welded to the respective terminal edges of the respective electrode plates being provided with a plurality of cutout parts, in a radial manner, which extend from the area of the center of the collector through the outer peripheral edge of the current collector, and with downward rib-formed projections respectively formed integrally at the edge parts of the respective cutout parts, and the respective projections and the terminal edges of the electrode plates crossing each other and being welded with each other at a plurality of spots while the projections partly bite into the terminal edges of the electrode plates, wherein the downward projection of the current collector is formed in the same thickness as the plate part, and wherein the terminal edge of the downward projection is sharp.

5. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case.

the respective current collectors welded to the respective terminal edges of the respective electrode plates being provided with a plurality of cutout parts, in a radial manner, which extend from the area of the center of the collector through the outer peripheral edge of the current collector, and with downward rib-formed projections respectively formed integrally at the edge parts of the respective cutout parts, and the respective projections and the terminal edges of the electrode plates crossing each other and being welded with each other at a plurality of spots while the projections partly bite into the terminal edges of the electrode plates, wherein the downward projection of the current collector is formed in a thickness smaller than that of the plate part and wherein the terminal edge of the downward projection is sharp.

6. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, the respective current collectors welded to the respective terminal edges of the respective electrode plates being provided with a plurality of cutout parts, in a radial manner, which extend from the area of the center of the collector through the outer peripheral edge of the current collector, and with downward rib-formed projections respectively formed integrally at the edge parts of the respective cutout parts, and the respective projections and the terminal edges of the electrode plates crossing each other and being welded with each other at a plurality of spots while the projections partly bite into the terminal edges of the electrode plates, wherein the downward projection of the current collector is formed in a thickness larger than that of the plate part and the terminal edge of the projection is sharp.

7. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case.

the respective current collectors welded to the respective terminal edges of the respective electrode plates being provided with a plurality of cutout parts, in a radial manner, which extend from the area of the center of the collector through the outer peripheral edge of the current collector, and with downward rib-formed projections respectively formed integrally at the edge parts of the respective cutout parts, and the respective projections and the terminal edges of the electrode plates crossing each other and being welded with each other at a plurality of spots while the projections partly bite into the terminal edges of the electrode plates, wherein the parts projecting upward and downward of the spirally coiled electrode plate assembly consists essentially of bare parts of respective perforation sheets of the positive and the negative electrode plates and the projection of the current collector welded to the terminal edge of the perforation sheet bare part has a thickness in a range of two to eight times that of the perforation sheet, wherein the projection length of the current collector from the plate part falls within a range of $1/5$ to $2/3$ of the length of the bare perforation sheet part.

8. A cylindrical storage battery comprising a spirally coiled electrode plate assembly consisting essentially of a positive electrode plate, a negative electrode plate and a separator each in the form of a strip, the terminal edge of one electrode plate protecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, the respective current collectors welded to the respective terminal edges of the respective electrode plates being provided with a plurality of cutout parts, in a radial manner, which extend from the area of the center of the collector through the outer peripheral edge of the current collector, and with downward rib-formed projections respectively formed integrally at the edge parts of the respective cutout parts, and the respective projections and the terminal edges of the electrode plates crossing each other and being welded with each other at a plurality of spots while the projections partly bite into the terminal edges of the electrode plates, wherein the current collector welded to the terminal edge of one side electrode plate projecting upward of the spirally coiled electrode plate assembly is welded to one end of a rectangular lead piece and the other end of the lead piece is welded to the under surface of the sealing plate at at least one place.

* * * * *